UNITED STATES PATENT OFFICE.

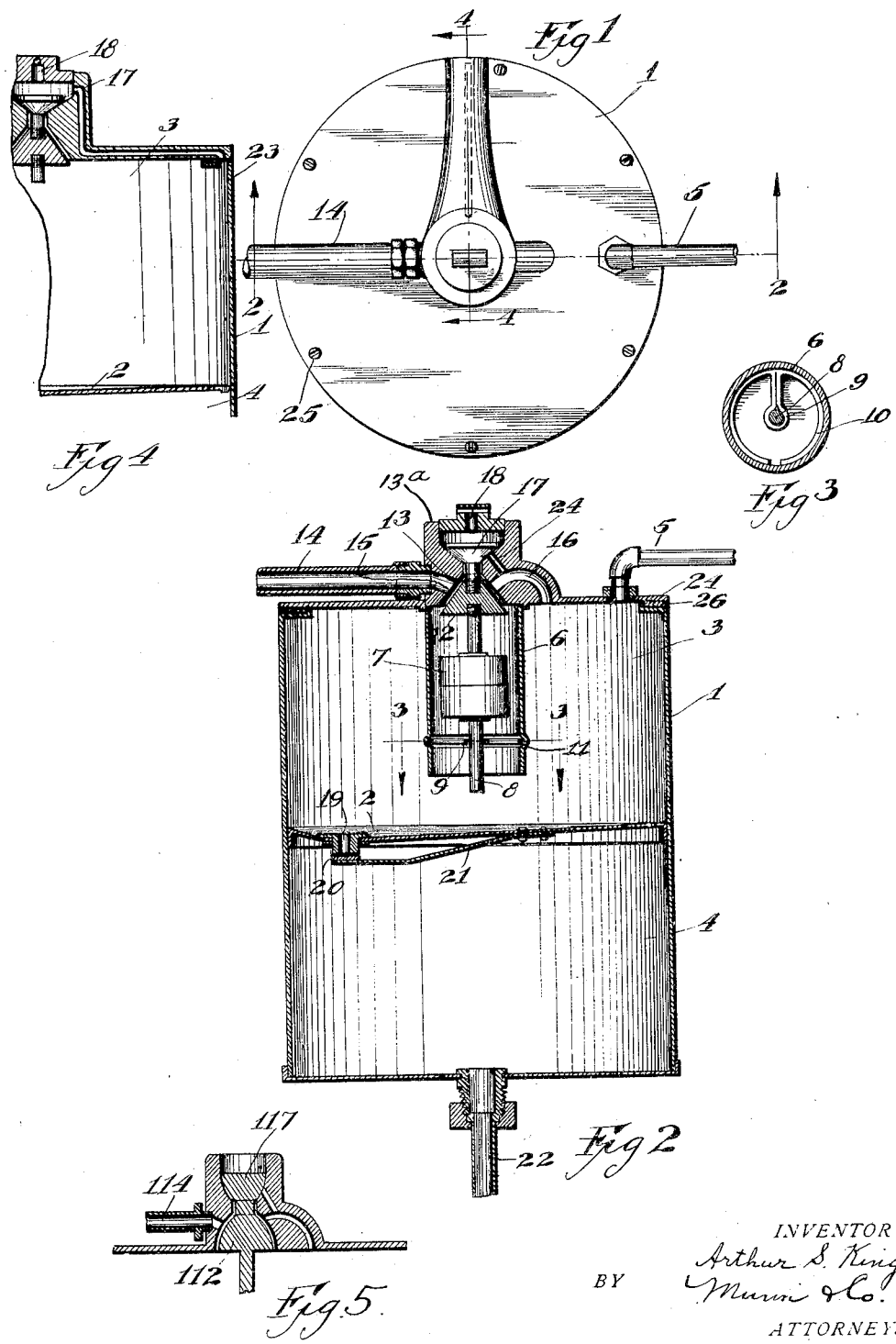

ARTHUR SHELLEY KING, OF PAWNEE CITY, NEBRASKA.

AUTOMATIC FUEL-FEEDING DEVICE.

1,370,120. Specification of Letters Patent. Patented Mar. 1, 1921.

Application filed September 27, 1919. Serial No. 326,969.

*To all whom it may concern:*

Be it known that I, ARTHUR S. KING, a citizen of the United States, and a resident of Pawnee City, in the county of Pawnee and State of Nebraska, have invented a new and useful Improvement in Automatic Fuel-Feeding Devices, of which the following is a full, clear, and exact description.

My invention relates to improvements in devices for automatically feeding the liquid fuel from the storage tank to the carbureter of an internal combustion engine, such as that used for automobiles, and it consists in the combinations, constructions and arrangements herein described and claimed.

An object of my invention is to provide a device by means of which the feeding of the fuel is rendered positive through the action of the engine.

A further object of my invention is to provide a device of the type described which is simple in construction and which is not liable to easily get out of order.

Other objects and advantages will appear in the following specification, and the novel features of the invention will be particularly pointed out in the appended claims.

My invention is illustrated in the accompanying drawings, forming part of this application, in which—

Figure 1 is a plan view of the device,

Fig. 2 is a section along the line 2—2 of Fig. 1,

Fig. 3 is a section along the line 3—3 of Fig. 2, and

Fig. 4 is a section along the line 4—4 of Fig. 1, and

Fig. 5 is a section through a modified form of valve construction.

In carrying out my invention, I provide a receptacle 1 having a partition 2 therein so as to divide the receptacle into an upper chamber 3 and a lower chamber 4. Communicating with the upper chamber 3 is a pipe 5 leading from the fuel supply reservoir (not shown). Extending downwardly from the top of the chamber 3 is a tube 6 which is open at its bottom. This tube incloses a float 7 having a guide stem 8 disposed in a guide loop 9 in the form of a ring 10, which fits into a curved channel 11 in the wall of the tube 6. The float 7 is connected with a valve 12 which is adapted to engage a seat 13 in the valve casing 13ˣ carried by the top of the receptacle. An auxiliary pipe 14 leads from the intake manifold (not shown) of the engine, and communicates with a passage 15. A passage 16 communicates at one end with the interior of the chamber 3, the other end being adapted to be closed by the valve 12. The valve 12 is connected with another valve 17 which is adapted to close a passage 24 communicating with the passage 16. An air inlet 18 admits air into the space above the valve 17.

The partition 2 has an outlet 19 which is kept normally closed by a valve 20 at the end of a spring 21 which is secured to the partition. The lower end of the chamber 4 communicates by means of a pipe 22 with the carbureter (not shown). The chamber 4 also communicates by means of a passage 23 (see Fig. 4) with the space above the valve 17 which communicates with the outer atmosphere by means of the passage 18. The receptacle 1 is provided with a cover 24 which supports the valve mechanism, and this cover is secured to the body portion by means of screws 25, a gasket 26 being provided for rendering the joint air tight.

From the foregoing description of the various parts of the device, the operation thereof may be readily understood.

When the engine is running, the auxiliary pipe 14 from the intake manifold is under decreased pressure, due to the movement of the pistons of the engine in sucking in fuel from the manifold. This action of the engine, which tends to exhaust the air in the pipe 14, leaves the upper chamber 3 under decreased pressure, and the fuel thereupon flows through the pipe 5 and into the upper chamber. When the fuel reaches the float, the latter rises, being guided by the ring 10. The valve 12 is then closed, while the valve 17 is opened. This permits air to enter through the opening 18, past the valve 17, and through a passage 24 communicating with the passage 16. Air is admitted thus to the chamber 3, but not to the tube 6. The admission of the air in the upper chamber causes the valve 20 to open so that the liquid fuel in the upper chamber now flows out through the passage 19 into the lower chamber 4. This lower chamber 4, being in communication with the outer atmosphere by means of the passages 23 and 18, is under atmospheric pressure, thereby eliminating any tendency for a vacuum in the chamber.

When the float 7 has descended far enough, the valve 17 will close, and the valve 12 will open. The conditions are precisely then as before, and the same action is gone through with. The chamber 4 communicates, as stated, through the pipe 22 with the carbureter (not shown). The mere working of the engine, it will be observed, causes the filling of the upper chamber, while the valves cause the discharge of the fuel into the lower compartment when the liquid in the upper compartment has reached a predetermined level.

Instead of the valve shown in Fig. 2, I may use one made like that shown in Fig. 5. In this figure the valve 112 is connected with the valve 117. The auxiliary pipe 114 in this form acts in the same manner as the pipe 14 in Fig. 2. The valve construction acts also in the same manner to alternately create and relieve the vacuum in the upper chamber so as to draw fuel through the pipe 5 and to discharge it into the lower chamber.

The device is simple in construction and positive in action.

I claim:

1. An automatic fuel feeding device comprising a receptacle having an upper and a lower chamber, a valve for controlling communication between said chambers, said lower chamber being in constant communication with the outer atmosphere, a fuel inlet pipe connected with said upper chamber, an auxiliary pipe adapted to be connected with the intake manifold of the engine, a tube secured to the top of the upper chamber and depending therefrom, a float disposed within the tube, a valve casing carried by said receptacle above said tube and having passages for establishing communication between the upper end of the tube and the upper chamber, and between the tube and said auxiliary pipe, means connected with said float for simultaneously shutting off communication between the upper end of the tube and the auxiliary pipe, and the upper end of the tube and the upper chamber, and for establishing communication between the upper chamber and the outer atmosphere.

2. An automatic fuel feeding device comprising a receptacle having an upper and a lower chamber, a valve for controlling communication between said chambers, said lower chamber being in constant communication with the outer atmosphere, a fuel inlet pipe connected with said upper chamber, an auxiliary pipe adapted to be connected with the intake manifold of the engine, a tube secured to the top of the upper chamber and depending therefrom, a float disposed within the tube, a valve casing carried by said receptacle above said tube and having passages for establishing communication between the upper end of the tube and the upper chamber, and between the tube and said auxiliary pipe, a valve connected with said float for shutting off said passages, and a second valve connected with said first named valve for establishing communication between the passage leading to the upper chamber, and the outer atmosphere.

ARTHUR SHELLEY KING.